(12) United States Patent
Shin et al.

(10) Patent No.: US 6,746,355 B2
(45) Date of Patent: Jun. 8, 2004

(54) HYDRAULIC CONTROL SYSTEM FOR AUTOMATIC TRANSMISSION

(75) Inventors: Byung-Kwan Shin, Hwaseong (KR); Jae-Shin Yi, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,238

(22) Filed: Dec. 30, 2002

(65) Prior Publication Data

US 2004/0058771 A1 Mar. 25, 2004

(30) Foreign Application Priority Data

Aug. 12, 2002 (KR) ................................ 10-2002-0047479

(51) Int. Cl.[7] .............................................. F16H 31/00
(52) U.S. Cl. ...................... 475/119; 475/120; 475/122; 475/127; 477/117; 477/158
(58) Field of Search ................................. 475/119, 120, 475/122, 127, 59, 116; 477/149, 130, 117, 131, 158, 906, 69

(56) References Cited

U.S. PATENT DOCUMENTS

| | | | | |
|---|---|---|---|---|
| 5,957,809 A | * | 9/1999 | Jang | 477/149 |
| 6,139,469 A | * | 10/2000 | Jang | 477/130 |
| 6,394,926 B1 | * | 5/2002 | Jang | 475/116 |
| 6,440,028 B2 | * | 8/2002 | Kim et al. | 475/131 |
| 6,478,707 B1 | * | 11/2002 | Jang | 475/119 |
| 6,537,180 B2 | * | 3/2003 | Kim et al. | 477/130 |
| 6,609,991 B2 | * | 8/2003 | Jang | 475/119 |

* cited by examiner

Primary Examiner—Tisha D Lewis
(74) Attorney, Agent, or Firm—Morgan Lewis & Bockius LLP

(57) ABSTRACT

A hydraulic control system for an automatic transmission, in which four forward speeds and one reverse speed are realized by the use of a reduced number of friction elements compared to the prior art such that overall structure is simplified, the weight of the automatic transmission is decreased, and the cost of production is reduced. In the hydraulic control system, hydraulic pressure generated in an oil pump is controlled to a predetermined level by a regulator valve, and part of this pressure is supplied as operational pressure of a damper clutch and to a reducing valve, and another part of this pressure is supplied to a hydraulic pressure control section for the selective supply of operational pressure to friction elements that are engaged in each shift range and speed, the hydraulic pressure control section including a shift control assembly, a hydraulic pressure control assembly, a switching assembly, a fail-safe assembly, and a N-R control assembly.

20 Claims, 4 Drawing Sheets

HYDRAULIC CONTROL SYSTEM FOR AUTOMATIC TRANSMISSION

FIELD OF THE INVENTION

The present invention relates to a hydraulic control system for an automatic transmission of a vehicle.

BACKGROUND OF THE INVENTION

Conventional automatic transmissions used in vehicles typically include a torque converter, a powertrain realized through a multi-stage gearshift mechanism that is connected to the torque converter, and a hydraulic control system that selectively operates one of a plurality of operational elements of the powertrain based on the driving state of the vehicle.

In designing such an automatic transmission, a design concept and plan are formulated based on a variety of factors such as performance, durability, reliability, mass-producibility, and manufacturing costs. After selecting a design concept, development is pursued in three broad areas that include mechanical operation, hydraulic control (by a hydraulic control system), and electronic control.

Although the powertrain and the hydraulic control system are structured differently depending on the manufacturer, most automatic transmissions used in small and medium-sized vehicles include two planetary gearsets to provide four forward speeds and one reverse speed. Also, such automatic transmissions generally include four clutches, two brakes, two one-way clutches, and a hydraulic control system that corresponds to such a configuration. However, the application of these elements, that is, the four clutches, two brakes, and two one-way clutches complicates the structure, increases the overall size and weight of the automatic transmission, and also increases costs.

SUMMARY OF THE INVENTION

Embodiments of the present invention provide a hydraulic control system for an automatic transmission, in which four forward speeds and one reverse speed are effected while reducing the number of friction elements. This simplifies the overall structure and decreases the weight of the automatic transmission. This also reduces the cost of production of the automatic transmission.

In one embodiment, the present invention provides a hydraulic control system for an automatic transmission, in which hydraulic pressure generated in an oil pump is controlled to a predetermined level by a regulator valve. Part of this pressure is supplied as operational pressure of a damper clutch and to a reducing valve. Another part of this pressure is supplied to a hydraulic pressure control section for the selective supply of operational pressure to friction elements that are engaged in each shift range and speed. The hydraulic pressure control section including a shift control assembly, a hydraulic pressure control assembly, a switching assembly, a fail-safe assembly, and an N-R control assembly.

The shifting control assembly includes a manual valve, which is indexed with a driver-manipulated select lever to realize line conversion. The hydraulic pressure control assembly includes a first pressure control valve and a first solenoid valve controlling N-D range pressure for supply to a friction element(s) operating in third and fourth speeds, a second pressure control valve and a second solenoid valve controlling D range pressure for supply to a friction element (s) operating in second and fourth speeds, and a third pressure control valve and a third solenoid valve controlling D range pressure for control to a friction element(s) operating in first, second, and third speeds.

The switching assembly includes a switch valve effecting port conversion by line pressure supplied to both ends thereof and by hydraulic pressure supplied to the fourth solenoid valve. The switch valve also selectively supplies hydraulic pressure supplied to the first pressure control valve to a friction element(s) operating as a fixing element(s) in neutral N, park P, and reverse R ranges, and to a friction element(s) operating as an input element(s) in third and fourth speeds.

The fail-safe assembly includes a first fail-safe valve controlled by line pressure, operational pressure of a friction element(s) operating as an input element(s) in third and fourth speeds, and operational pressure of a friction element (s) operating as a fixed element(s) in second and fourth speeds. The first fail-safe valve selectively supplies hydraulic pressure supplied to the switch valve and reverse pressure supplied from the manual valve to a friction element(s) operating as a fixed element(s) in the neutral N, park P, and reverse R ranges. It also includes a second fail-safe valve controlled by N-D range pressure, R range pressure, operational pressure of a friction element(s) operating as an input element(s) in first, second, and third speeds, and operational pressure of a friction element(s) operating as an input element(s) in third and fourth speeds. The second fail-safe valve also selectively supplies control pressure of the second pressure control valve to a friction element(s) operating as a fixed element(s) in second and fourth speeds.

The N-R control valve includes an N-R control valve controlled by control pressure supplied from the second solenoid valve in the reverse R range, and supplying hydraulic pressure supplied from the manual valve to a friction element(s) operating as an input element(s) in the reverse R range.

BRIEF DESCRIPTION OF THE DRAWINGS

The accompanying drawings, which are incorporated in and constitute a part of the specification, illustrate an embodiment of the invention, and, together with the description, serve to explain the principles of the invention.

Preferred embodiments of the present invention will now be described in detail with reference to the accompanying drawings.

DETAILED DESCRIPTION OF THE PREFERRED EMBODIMENTS

Figure 1:
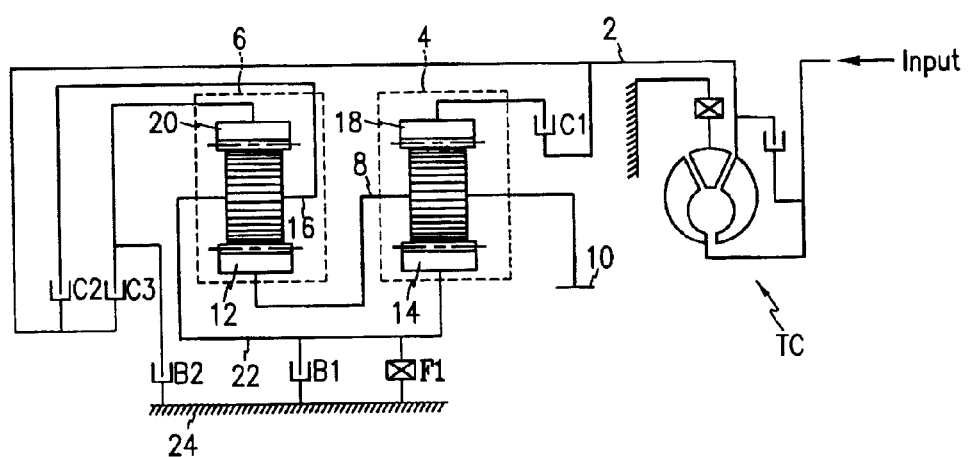
FIG. 1 is a schematic view showing an example of a powertrain to which a hydraulic control system according to a preferred embodiment of the present invention may be applied.

As shown in FIG. 1, the powertrain may be realized according to the invention through two single pinion planetary gearsets (i.e., first and second planetary gearsets 4 and 6). An input shaft 2 receives rotational force from a turbine of a torque converter TC and transmits torque to the first and second single pinion planetary gearsets 4 and 6. Shifting is realized by the complementary operation of the first and second single pinion planetary gearsets 4 and 6. Clutch hookup is effected through a transfer drive gear 10 that is connected to a first planet carrier 8 of the first single pinion planetary gearset 4.

To effect the clutch hookup, the first planet carrier 8 is fixedly connected to a second ring gear 12, and a first ring gear 14 is fixedly connected to a second planet carrier 16. Also, a first sun gear 18, the second planet carrier 16, and a second sun gear 20 are variably connected to the input shaft 2 respectively with first, second, and third friction elements C1, C2, and C3, respectively. Such friction elements are preferable which interposed clutches that realize three input elements.

Further, a connecting member 22 that interconnects the first ring gear 14 and the second planet carrier 16 is variably connected to a housing 24 by a fourth friction element B1, which is preferably a brake, and by a first one-way clutch F1. The second sun gear 20 is variably connected to the housing 24 by a fifth friction element B2, which is preferably a brake. This creates two fixed elements.

Each of the clutches C1, C2, and C3, and the brakes B1 and B2 include a piston or a servo assembly, and are engaged or disengaged by supply and exhaust of hydraulic pressure. The engagement and disengagement of the friction elements C1, C2, C3, B1, and B2 are realized as shown in Table 1 below depending on the speed or range into which shifting is to be performed.

TABLE 1

| Shift range | Friction element | | | | | |
|---|---|---|---|---|---|---|
| | C1 | C2 | C3 | B1 | B2 | F1 |
| N,P | | | | X | | |
| First speed | X | | | | | X |
| Second speed | X | | | | X | |
| Third speed | X | X | | | | |
| Fourth speed | | X | | | X | |
| Reverse R range | | | X | X | | |
| Low L range | X | | | X | | X |

Figure 2:
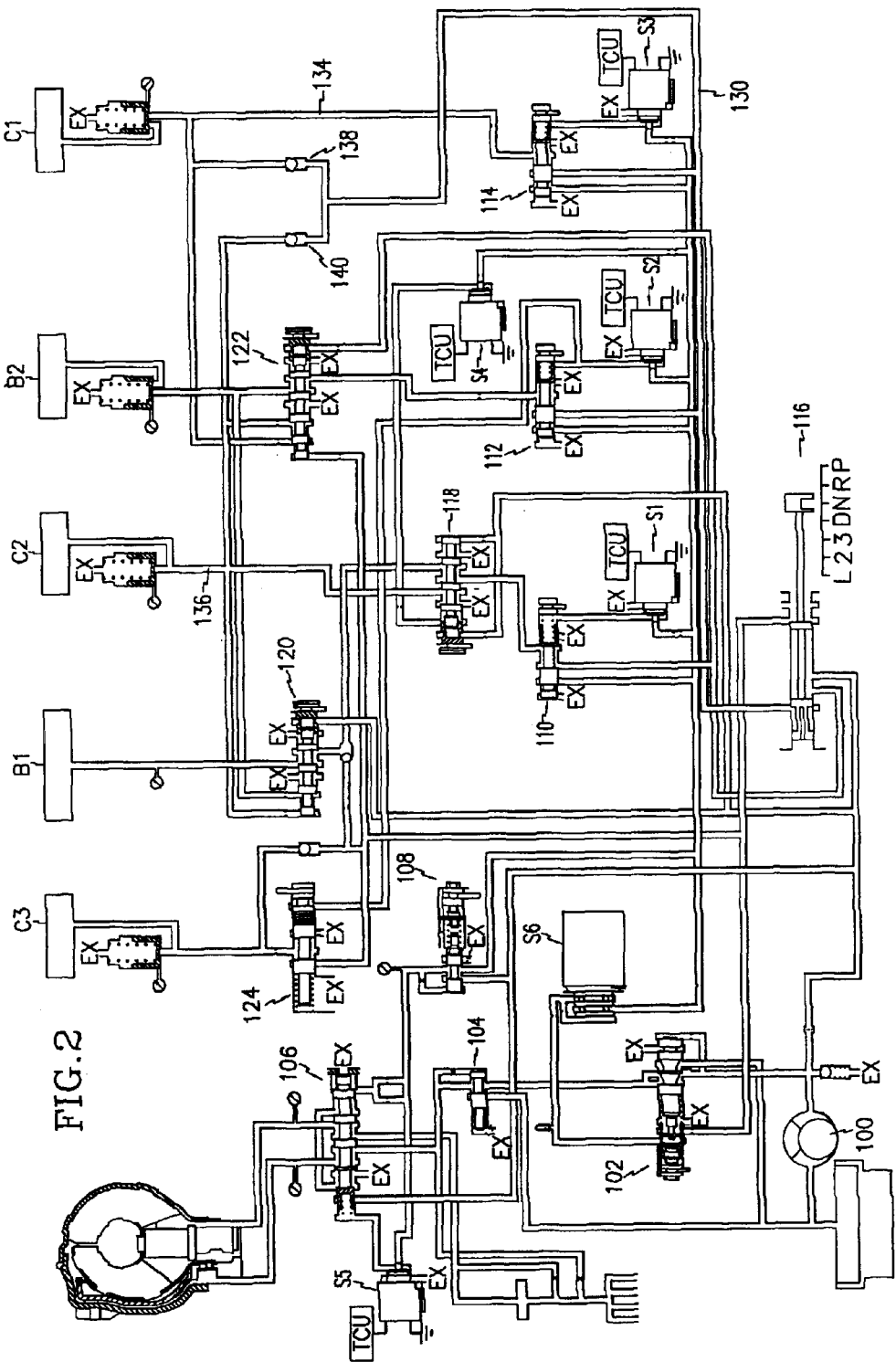
FIG. 2 is hydraulic circuit diagram of a hydraulic control system according to a preferred embodiment of the present invention.

A hydraulic control system for operating the above powertrain that realizes four forward speeds and a reverse range is shown in FIG. 2. With the operation of the torque converter, which receives power from an engine and performs torque conversion before supply thereof to the automatic transmission, an oil pump 100 is operated to generate hydraulic pressure for the torque converter, and for shift control and lubrication. The hydraulic pressure generated by the oil pump 100 is supplied to a pressure regulating/damper clutch control assembly and to a pressure reducing assembly, and simultaneously to a hydraulic pressure control assembly through a manual/automatic shift control assembly. The manual/automatic shift control assembly forms a shift mode, to suitably control hydraulic pressure for shifting. Pressure that is controlled in this manner is supplied as operational pressure to each friction element through a switching assembly and a fail-safe assembly.

In the reverse R range, hydraulic pressure is supplied to a hydraulic pressure control section that is structured to allow the supply of hydraulic pressure to the friction elements through an N-R control assembly from the manual/automatic control assembly.

The pressure regulating/damper clutch control assembly includes a regulator valve 102 that controls the hydraulic pressure transmitted from the oil pump 100 to a predetermined level, a torque converter control valve 104 that controls hydraulic pressure from the regulator valve 102 to a predetermined level for the torque converter and for lubrication, and a damper clutch control valve 106 for controlling a damper clutch to increase power transmission efficiency of the torque converter.

The pressure reducing assembly is realized through a reducing valve 108, which reduces hydraulic pressure to a level lower than line pressure. Part of the hydraulic pressure reduced by the reducing valve 108 is supplied as control pressure to the damper clutch control valve 106, and, at the same time, as control pressure to the regulator valve 102. Further, another part of the pressure reduced by the reducing valve 108 is supplied to the hydraulic pressure control assembly, which includes first, second, and third pressure control valves 110, 112, and 114, and first, second, and third solenoid valves S1, S2, and S3 for controlling the first, second, and third pressure control valves 110, 112, and 114, respectively.

The shift control assembly, which forms manual and automatic shift modes, is realized through a manual valve 116. The manual valve 116 is indexed with a select lever, which is manipulated by the driver, to realize line conversion. Hydraulic pressure supplied to the manual valve 116 is supplied, depending on the range selection, either to the hydraulic pressure control assembly or as control pressure directly to a switch valve 118 of the switching assembly, first and second fail-safe valves 120 and 122 of the fail-safe assembly, and an N-R control valve 124 of the N-R control assembly, or to a corresponding friction element(s) after passing through these elements.

The first, second, and third solenoid valves S1, S2, and S3 perform minute control of hydraulic pressure by controlling a transmission control unit TCU. Accordingly, the first, second, and third solenoid valves S1, S2, and S3 are duty control valves or linear solenoid valves. A fourth solenoid valve S4, which controls the switch valve 118, is an On/Off conversion valve. Further, the damper clutch control valve 106 undergoes line conversion by control of a fifth solenoid valve S5 to control the damper clutch in the torque converter.

The regulator valve 102 realizes line pressure control in the speeds of the drive D range by a control pressure of a sixth solenoid valve S6 depending on driving conditions, to prevent drive loss of the oil pump 100 caused by excess line pressure. Such operation minimizes fuel consumption. Also, the regulator valve 102 realizes line pressure control by reverse pressure supplied from the manual valve 116 in the reverse R range.

A first clutch line 134 that interconnects the third pressure control valve 114 and the first clutch C1, and a second clutch line 136 that interconnects the switch valve 118 and the second clutch C2 are each connected to a D range line 130. Check valves 138 and 140 are provided on the first and second clutch lines 134 and 136, respectively. The check valves 138 and 140 are structured such that D range pressure does not flow into the lines 134 and 136. This allows for the quick exhaust of operational pressure of the first and second clutches C1 and C2 through the manual valve 116 during the shift process.

Figure 3:
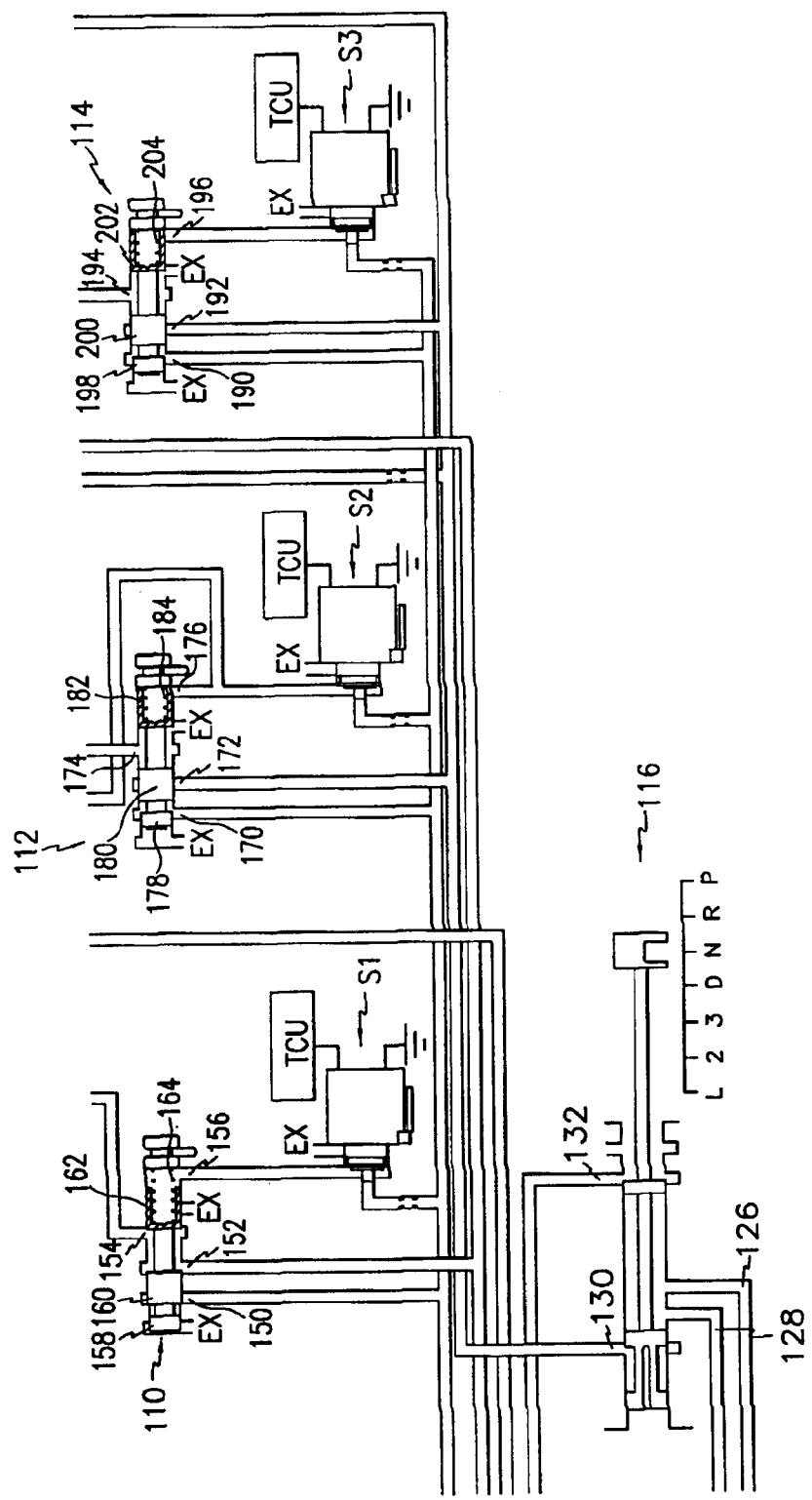
FIG. 3 is detailed circuit diagram of a hydraulic pressure control assembly of the hydraulic control system of FIG. 2.

With reference to FIG. 3, the manual valve 116 is structured as shown. If hydraulic pressure is supplied through a line pressure line 126, which communicates with the regulator valve 102, manual shifting is performed by the supply of hydraulic pressure through an N-D range pressure line 128, a D range pressure line 130, and an R range pressure line 132.

The N-D range pressure line 128 realizes connections for the supply of control pressure to the first pressure control valve 110 to control the same, and simultaneously, for the supply of control pressure to the second fail-safe valve 122. The D range pressure line 130 realizes connections for the supply of hydraulic pressure to the second and third pressure control valves 112 and 114, and the R range pressure line 132 realizes connections for the supply of hydraulic pressure to the second fail-safe valve 122, the N-R control valve 124, and the regulator valve 102.

Hydraulic pressure for the control of the first pressure control valve 110 and the first solenoid valve S1, which form the hydraulic pressure control assembly, is supplied to the second clutch C2 through the switch valve 118, or to the first brake B1 through the first fail-safe valve 120.

To realize such operation, a valve body of the first pressure control valve 110 includes a first port 150 for receiving hydraulic pressure reduced by the reducing valve 108, a second port 152 for receiving N-D pressure from the manual valve 116, a third port 154 for supplying hydraulic pressure supplied from the second port 152 to the switch valve 118, and a fourth port 156 for receiving control pressure from the first solenoid valve S1.

Further, a valve spool provided within the valve body of the first pressure control valve 110 includes a first land 158 on which hydraulic pressure supplied through the first port 150 acts; a second land 160 on which hydraulic pressure supplied through the first port 150 acts to selectively, together with the first land 158, open and close the second port 152; and a third land 162 for selectively, together with the second land 160, communicating the second port 152 and the third port 154. An elastic member 164 is interposed between the third land 162 and the valve body. The elastic member 164 provides a constant biasing force to the valve spool in a leftward direction (in the drawing).

With this configuration, if the first solenoid valve S1 is controlled to Off, control pressure is supplied to the fourth port 156 such that the valve spool is biased leftward (in the drawing). As a result, the second port 152 and the third port 154 are communicated and hydraulic pressure is supplied to the switch valve 120. On the other hand, if the first solenoid valve SI is controlled to On, control pressure supplied to the fourth port 156 is cut off such that the valve spool of the first pressure control valve 110 is displaced rightward (in the drawing) by the reducing valve pressure supplied to the first port 150. This results in the closing off of the second port 152.

The second pressure control valve 112 is structured to control D range pressure such that operational pressure is supplied to the second brake B2 via the second fail-safe valve 122. The configuration is similar to that of the first pressure control valve 110. In particular, a valve body of the second pressure control valve 112 includes a first port 170 for receiving hydraulic pressure reduced by the reducing valve 108, a second port 172 for receiving D range pressure from the manual valve 116, a third port 174 for supplying hydraulic pressure supplied to the second port 172 to the second fail-safe valve 122, and a fourth port 176 for receiving control pressure from the second solenoid valve S2.

A valve spool provided within the valve body of the second pressure control valve 112 includes a first land 178 on which hydraulic pressure supplied through the first port 170 acts and that has a relatively small diameter, a second land 180 on which hydraulic pressure supplied through the first port 170 acts and that selectively opens and closes the second port 172, and a third land 182 for selectively communicating the second port 172 and the third port 174 together with the second land 180. An elastic member 184 is interposed between the third land 182 and the valve body. The elastic member 184 provides a constant biasing force to the valve spool in a rightward direction (in the drawing).

With this configuration, if the second solenoid valve S2 is controlled to On, the supply of hydraulic pressure to the fourth port 176 is discontinued such that the valve spool of the second pressure control valve 112 is biased rightward (in the drawing) by the reducing valve pressure supplied to the first port 170. This results in the second port 172 being closed. On the other hand, if the second solenoid valve S2 is controlled to Off, control pressure is supplied to the fourth port 176 and the valve spool is biased leftward (in the drawing). As a result, the second port 172 and the third port 174 are communicated such that hydraulic pressure is supplied to the second fail-safe valve 122.

The third pressure control valve 114 is structured to supply hydraulic pressure to the first clutch C1, and simultaneously, to supply control pressure to the second fail-safe valve 122. To perform these operations, a valve body of the third pressure control valve 114 includes a first port 190 for receiving reduced hydraulic pressure from the reducing valve 108, a second port 192 for receiving D range pressure from the manual valve 116, a third port 194 for supplying hydraulic pressure supplied to the second port 192 to the first clutch C1 and the second fail-safe valve 122, and a fourth port 196 for receiving control pressure from the third solenoid valve S3.

A valve spool provided in the valve body of the third pressure control valve includes a first land 198 on which hydraulic pressure supplied through the first port 190 acts and that has a relatively small diameter, a second land 200 on which hydraulic pressure supplied through the first port 190 acts and that selectively opens and closes the second port 192, and a third land 202 for selectively communicating the second port 192 and the third port 194 together with the second land 200. An elastic member 204 is interposed between the valve body and the third land 202. The elastic member 204 provides a constant biasing force to the valve spool in the leftward direction (in the drawing).

With this configuration, if the third solenoid valve S3 is controlled to On, the valve spool of the third pressure control valve 114 is displaced to the right (in the drawing) and the second port 192 is closed. If the third solenoid valve S3 is controlled to Off, on the other hand, control pressure is supplied and the valve spool is displaced to the left (in the drawing) such that the second port 192 and the third port 194 are communicated. This results in hydraulic pressure from the manual valve 114 being supplied to the first clutch C1 and the second fail-safe valve 122.

Figure 4:
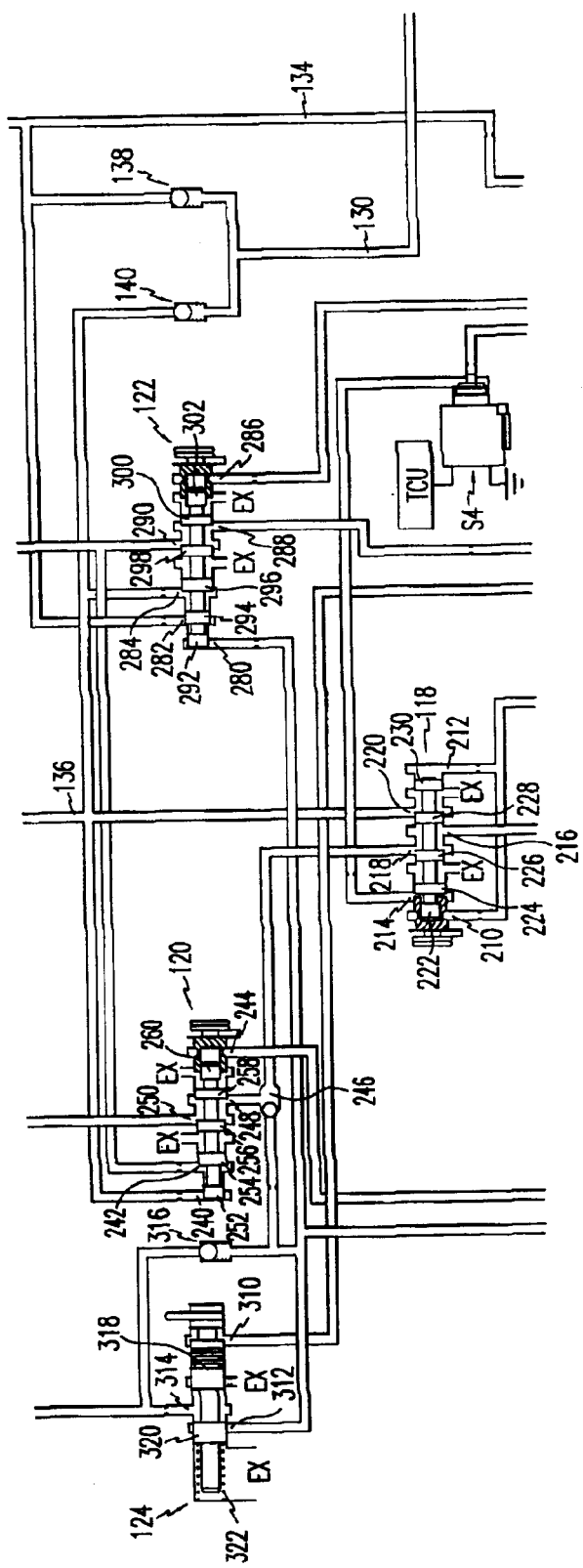
FIG. 4 is a detailed circuit diagram of a switching assembly, a fail-safe assembly, and an N-R control assembly of the hydraulic control system of FIG. 2.

Further, the switch valve 118, with reference to FIG. 4, undergoes port conversion by line pressure supplied to both ends and by hydraulic pressure supplied from the fourth solenoid valve S4, and selectively supplies hydraulic pressure supplied from the first pressure control valve 110 to the first brake B1 through the first fail-safe valve 120 or directly to the second clutch C2.

To perform such operation, a valve body of the switch valve 118 includes first and second ports 210 and 212 formed on opposite ends of the valve body and receiving line pressure, a third port 214 adjacent to the first port 210 and which receives control pressure of the fourth solenoid valve S4, a fourth port 216 for receiving hydraulic pressure from the first pressure control valve 110, a fifth port 218 for supplying hydraulic pressure supplied to the fourth port 216 to the first brake B1 through the fail-safe valve 120, and a sixth port 220 for selectively supplying hydraulic pressure supplied to the fourth port 216 to the second clutch C2.

A valve spool provided within the valve body of the switch valve 118 is controlled by hydraulic pressure supplied to the first, second, and third ports 210, 212, and 214 and includes a first land 222 on which control pressure supplied through the first port 210 acts; a second land 224 on which, together with the first land 222, control pressure supplied through the second port 214 acts; a third land 226 for selectively communicating the fourth port 216 with the fifth port 218; a fourth land 228 for selectively, together with the third land 226, communicating the fourth port 216 with the sixth port 220; and a fifth land 230 on which hydraulic pressure supplied through the second port 212 acts.

If the valve spool is displaced in the leftward direction (in the drawing), the fourth port 216 and the fifth port 218 are communicated, and if the valve spool is displaced in the rightward direction (in the drawing), the fourth port 216 and the sixth port 220 are communicated.

The first and second fail-safe valves 120 and 122 that form the fail-safe assembly prevent the simultaneous engagement of the first and second brakes B1 and B2, which act as reaction elements, and allow for the hold of the third speed of the drive D range if there is a malfunction in the automatic transmission while driving the vehicle. To perform these operations, a valve body of the first fail-safe valve 120 includes a first port 240 for receiving as control pressure hydraulic pressure supplied to the second clutch C2, a second port 242 for receiving as control pressure hydraulic pressure supplied to the second brake B2, a third port 244 for receiving line pressure as control pressure, a fourth port 248 for receiving R range pressure and hydraulic pressure from the switch valve 118 through a shuttle valve 246, and a fifth port 250 for supplying hydraulic pressure supplied to the fourth port 248 to the first brake B1.

A valve spool provided within the valve body of the first fail-safe valve 120 includes a first land 252 on which control pressure supplied through the first port 240 acts, a second land 254 on which control pressure supplied through the second port 242 acts, a third land 256 for selectively communicating the fourth port 248 and the fifth port 250, a fourth land 258 for selectively communicating, together with the third land 256, the fourth port 248 with the fifth port 250, and a fifth land 260 on which control pressure supplied to the third port 244 acts.

Accordingly, in the neutral N, park P, and low L ranges, control is performed by line pressure, and hydraulic pressure supplied to the switch valve 118 is supplied to the first brake B1. Further, in the reverse R range, R range pressure supplied from the manual valve 116 is supplied to the first brake B1.

The second fail-safe valve 122 is controlled by N-D range pressure, R range pressure, and by the first and second clutches C1 and C2, and selectively supply control pressure of the second pressure control valve 112 to the second brake B2. To perform such operations, a valve body of the second fail-safe valve 122 includes a first port 280 for receiving as control pressure R range pressure, a second port 282 for receiving part of the hydraulic pressure supplied to the first clutch C1 as control pressure, a third port 284 for receiving part of the hydraulic pressure supplied to the second clutch C2 as control pressure, a fourth port 286 for receiving N-D range pressure as control pressure, a fifth port 288 for receiving hydraulic pressure from the second pressure control valve 112, and a sixth port 290 for supplying hydraulic pressure supplied to the fifth port 288 to the second brake B2.

Further, a valve spool provided within the valve body of the second fail-safe valve 122 includes a first land 292 on which control pressure supplied through the first port 280 acts, a second land 294 on which control pressure supplied through the second port 282 acts, a third land 296 on which control pressure supplied through the third port 284 acts, a fourth land 298 for selectively communicating the fifth port 288 and the sixth port 290, a fifth land 300 for communicating the fifth port 288 and the sixth port 290 together with the fourth land 298, and a sixth land 302 on which control pressure supplied through the fourth port 286 acts.

Accordingly, in the second and fourth speeds of the drive D range, hydraulic pressure supplied from the second pressure control valve 112 is supplied to the second brake B2.

With reference again to FIG. 4, a valve body of the N-R control valve 124, which reduces shock during N-R manual shifting, includes a first port 310 for receiving control pressure of the second solenoid valve S2, a second port 312 connected to an R range pressure line, and a third port 314 for supplying hydraulic pressure supplied to the second port 312 to the third clutch C3. A line connected to the third port 314 is branched to form another line that connects to a line connected to the second port 312 with a third check valve 316 being provided on the branched line. The third check valve 316 ensures that hydraulic pressure does not flow from upstream to downstream, and operates only when hydraulic pressure supplied to the third clutch C3 is exhausted.

Further, a valve spool provided in the valve body of the N-R control valve 124 includes a first land 318 on which hydraulic pressure supplied through the first port 310 acts, and a second land 320 for selectively opening and closing the second and third ports 312 and 314. An elastic member 322 is interposed between the second land 320 and the valve body. The elastic member 322 provides a constant biasing force to the valve spool in the rightward direction (in the drawing).

Accordingly, the N-R control valve 124 is controlled by control pressure supplied from the solenoid valve S2 in the reverse R range such that hydraulic pressure supplied from the manual valve 116 is slowly supplied to the third clutch C3. This minimizes shift shock.

Referring back to FIGS. 2 and 3, while in the neutral N range, hydraulic flow generated by the oil pump 100 is controlled to a predetermined level by the regulator valve 102, and after being reduced by the reducing valve 108, is supplied to the damper clutch control valve 106 and to the first, second, and third pressure control valves 110, 112, and 114.

While in the drive D range, line pressure is supplied through the N-D range pressure line 128 and the D range pressure line 130 of the manual valve 116 to the first, second, and third pressure control valves 110, 112, and 114, and consequently to the switch valve 118, and to the first and second fail-safe valves 120 and 122.

In a state where hydraulic pressure is being supplied as described above, line conversion is performed by control of the solenoid valves to realize shifting. The control of the solenoid valves to On and Off states according to shift range and speed is shown in Table 2 below.

TABLE 2

| Shift range | Solenoid valve | | | | |
|---|---|---|---|---|---|
| | S1 | S2 | S3 | S4 | S5 |
| N,P | OFF | ON | ON | ON | OFF |
| First speed | ON | ON | OFF | ON | OFF |
| Second speed | ON | OFF | OFF | OFF | ON |
| Third speed | OFF | ON | OFF | OFF | ON |
| Fourth speed | OFF | OFF | ON | OFF | ON |
| Reverse R range | OFF | OFF | ON | ON | OFF |
| Low L range | OFF | ON | OFF | ON | OFF |

In more detail, in the neutral N range, the first solenoid valve S1 is controlled to Off by the transmission control unit, and the second, third, and fourth solenoid valves S2, S3, and S4 are controlled to On such that operational pressure is supplied to the first brake B1 to maintain the neutral state. In the parking P range, reverse range pressure is supplied to the first brake B1 by the displacement of the valve spool of the manual valve 116 to maintain the parking state.

If the select lever is changed by the driver to the drive D range from the neutral N range or the park P range, the first, second, and fourth solenoid valves S1, S2, and S4 are controlled to On, and the third solenoid valve S3 is controlled to Off. Accordingly, the valve spools of the first and second pressure control valves 110 and 112 are displaced rightward (in the drawing) such that the second ports 152 and 172 are blocked, and the valve spool of the third pressure control valve 114 is displaced leftward (in the drawing) such that the second port 192 and the third port 194 are communicated, thereby resulting the supply of hydraulic pressure to the first clutch C1 so that shifting into the first speed is realized.

If the vehicle is stopped while in the above first speed state, neutral control is performed. At this time, if it is detected that vehicle speed=0, foot brake=On, and throttle=Off, the transmission control unit controls the second solenoid valve S2 to Off and duty controls the third solenoid valve S3.

Here, control of the second solenoid valve S2 to Off to engage the first brake B1 is engaged, and duty control of hydraulic pressure of the first clutch C1 are done for the following reason. When on an incline, if the first clutch C1, which is an input clutch, is fully disengaged, it is possible for the vehicle to roll backward from its own weight when the brake is released to get ready for forward movement. With the engagement of the first brake B1 and the maintenance of an almost no-load state of the engine by the first clutch C1, fuel consumption is reduced.

If vehicle speed and throttle valve opening are increased from the first speed state, shifting into the second speed of the drive D range is performed. The transmission control unit controls the second solenoid valve S2 from On to Off, and the fourth solenoid valve S4 to Off. Accordingly, by the Off control of the fourth solenoid valve S4, control pressure supplied to the switch valve 118 is cut off such that the valve spool of the switch valve 118 is displaced leftward (in the drawing) by line pressure supplied to the second port 212.

By the leftward displacement of the valve spool, the second and third ports 172 and 174 are communicated such that hydraulic pressure on stand-by at the second port 172 is supplied to the fifth port 288 of the second fail-safe valve 122 through the third port 174. Here, although first clutch pressure and N-D range pressure are supplied as control pressure to the second fail-safe valve 122, since an area of the sixth land 300 on which hydraulic pressure acts is greater than that of the second land 294, the valve spool is displaced leftward (in the drawing) such that the fifth port 288 and the sixth port 290 are communicated for supply to the second brake B2, thereby realizing shifting into the second speed.

If vehicle speed and throttle valve opening are increased from the second speed state, the first solenoid valve S1 is controlled from On to Off, and the second solenoid valve S2 is controlled from Off to On. Accordingly, hydraulic pressure in the second pressure control valve 112 is cut off such that the second brake B2 is disengaged, and hydraulic pressure of the first pressure control valve 110 is supplied to the fourth port 216 of the switch valve 118. At this time, control pressure is supplied by the On control of the fourth solenoid valve S4 such that the valve spool of the switch valve 118 is displaced rightward. This results in the supply of hydraulic pressure to the second clutch C2 through the third port 214 and the sixth port 220 to thereby realize shifting into the third speed.

If vehicle speed and throttle valve opening are increased in the third speed state, the second solenoid valve S2 is control to Off from On, and the third solenoid valve S3 is controlled to On from Off. Accordingly, the valve spool of the third pressure control valve 114 is displaced rightward to close the second port 192, to thereby result in the disengagement of the first clutch C1. Further, by the Off control of the second solenoid valve S2, hydraulic pressure controlling the second solenoid valve S2 is supplied to the fifth port 288 of the second fail-safe valve 122.

At this time, first clutch pressure and N-D range pressure are supplied as control pressure to the second fail-safe valve 122. However, since an area of the sixth land 302 on which hydraulic pressure acts is greater than that of the second land 294, the valve spool is displaced leftward such that the fifth port 288 and the sixth port 290 are communicated and hydraulic pressure is supplied to the second brake B2. As a result, the second clutch C2 and the second brake B2 are engaged to realize shifting into the fourth speed.

Further, in a first speed of the low L range, unlike when in the first speed of the drive D range, the first solenoid valve S1 is controlled to Off such that hydraulic pressure is supplied to the first brake B1 from the first pressure control valve 110 through the switch valve 118 and the first fail-safe valve 120. As a result, shifting is realized by the engagement of the first clutch C1 and the first brake B1.

In the reverse R range, the first, second, and fifth solenoid valves S1, S2, and S5 are controlled to Off. As a result, hydraulic pressure supplied through the R range pressure line 132 is supplied to the first brake B1 and the third clutch C3 through the first fail-safe valve 120 and the N-R control valve 124. At this time, the valve spool of the first fail-safe valve 120 is displaced leftward (in the drawing) by line pressure such that the fifth port 248 and the sixth port 250 are communicated and hydraulic pressure is supplied to the first brake B1. In addition, the N-R control valve 124 receives control pressure resulting from the Off control of the second solenoid valve S2 such that its valve spool is displaced leftward (in the drawing). As a result, hydraulic pressure is supplied to the third clutch C3.

In the hydraulic control system for an automatic transmission of the present invention described above, four forward speeds and one reverse speed are effected through the use of three clutches and two brakes with two simple planetary gearsets, such that overall structure is simplified, the weight of the automatic transmission is decreased, and the cost of production is reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A hydraulic control system for an automatic transmission, in which hydraulic pressure generated in an oil pump is controlled to a predetermined level by a regulator valve, and part of this pressure is supplied as operational pressure to a damper clutch and to a reducing valve, and another part of this pressure is supplied to a hydraulic pressure control section for a selective supply of operational pressure to friction elements that are engaged in each shift range and speed, the hydraulic pressure control section including a shifting control assembly, a hydraulic pressure control assembly, a switching assembly, a fail-safe assembly, and an N-R control assembly, wherein the shifting control assembly includes a manual valve, which is indexed with a driver-manipulated select lever to realize line conversion;

wherein the hydraulic pressure control assembly includes a first pressure control valve and a first solenoid valve controlling N-D range pressure for supply to a friction element operating in third and fourth speeds, a second pressure control valve and a second solenoid valve controlling D range pressure for supply to a friction element operating in second and fourth speeds, and a third pressure control valve and a third solenoid valve controlling D range pressure for control to a friction element operating in first, second, and third speeds;

wherein the switching assembly includes a switch valve effecting port conversion by line pressure supplied to both ends thereof and by hydraulic pressure supplied to a fourth solenoid valve, and selectively supplying hydraulic pressure supplied to the first pressure control valve to a friction element operating as a fixing element in neutral N, park P, and reverse R ranges, and to a friction element operating as an input element in third and fourth speeds;

wherein the fail-safe assembly includes a first fail-safe valve controlled by line pressure, operational pressure of a friction element operating as an input element in third and fourth speeds, and operational pressure of a friction element operating as a fixed element in second and fourth speeds, and selectively supplying hydraulic pressure supplied to the switch valve and reverse pressure supplied from the manual valve to a friction element operating as a fixed element in the neutral N, park P, and reverse R ranges, and includes a second fail-safe valve controlled by N-D range pressure, R range pressure, operational pressure of a friction element operating as an input element in first, second, and third speeds, and operational pressure of a friction element operating as an input element in third and fourth speeds, and selectively supplying control pressure of the second pressure control valve to a friction element operating as a fixed element in second and fourth speeds; and wherein N-R control assembly includes an N-R control valve controlled by control pressure supplied from the second solenoid valve in the reverse R range, and supplying hydraulic pressure supplied from the manual valve to a friction element operating as an input element in the reverse R range.

2. The hydraulic control system of claim 1, wherein the manual valve includes a N-D range pressure line supplying control pressure to the first pressure control valve to control the same, and simultaneously supplying control pressure to the second fail-safe valve; a D range pressure line realizing connections for the supply of hydraulic pressure to the second and third pressure control valves; and a R range pressure line realizing connections for the supply of hydraulic pressure to the second fail-safe valve, the N-R control valve, and the regulator valve.

3. The hydraulic control system of claim 1, wherein the first, second, and third solenoid valves are duty control valves having a three-way valve that opens lines in an Off state.

4. The hydraulic control system of claim 1, wherein a line connecting the third pressure control valve and a friction element operating as an input element in the first, second, and third speeds, and a line connecting the switch valve and a friction element operating as an input element in the third and fourth speeds, are each connected to a D range pressure line, check valves being mounted to the lines to only allow for the reverse flow from downstream to upstream.

5. The hydraulic control system of claim 1, wherein the first pressure control valve comprises a valve body including a first port receiving hydraulic pressure reduced by the reducing valve, a second port receiving N-D pressure from the manual valve, a third port supplying hydraulic pressure supplied from the second port to the switch valve, and a fourth port receiving control pressure from the first solenoid valve; and a valve spool provided within the valve body and including a first land on which hydraulic pressure supplied through the first port acts, a second land on which hydraulic pressure supplied through the first port acts, together with the first land, to selectively open and close the second port, and a third land, together with the second land, selectively communicating the second port and the third port, an elastic member being interposed between the third land and the valve body.

6. The hydraulic control system of claim 1, wherein the second pressure control valve comprises a valve body including a first port receiving hydraulic pressure reduced by the reducing valve, a second port receiving D range pressure from the manual valve, a third port supplying hydraulic pressure supplied to the second port to the second fail-safe valve, and a fourth port receiving control pressure from the second solenoid valve; and a valve spool provided within the valve body and including a first land having a relatively small diameter, a second land on which hydraulic pressure supplied through the first port acts and that selectively opens and closes the second port, and a third land for selectively communicating the second port and the third port together with the second land, an elastic member being interposed between the third land and the valve body.

7. The hydraulic control system of claim 1, wherein third pressure control valve comprises a valve body including a first port receiving reduced hydraulic pressure from the reducing valve, a second port receiving D range pressure from the manual valve, a third port supplying hydraulic pressure supplied to the second port to the second fail-safe valve, and a fourth port receiving control pressure from the third solenoid valve; and a valve spool including a first land on which hydraulic pressure supplied through the first port acts and that has a relatively small diameter, a second land on which hydraulic pressure supplied through the first port acts and that selectively opens and closes the second port, and a third land selectively communicating the second port and the third port together with the second land, an elastic member being interposed between the valve body and the third land.

8. The hydraulic control system of claim 1, wherein the switch valve comprises a valve body including first and second ports formed on opposite ends of the valve body and receiving line pressure, a third port adjacent to the first port and which receives control pressure of a fourth solenoid valve, a fourth port receiving hydraulic pressure from the first pressure control valve, a fifth port supplying hydraulic pressure supplied to the fourth port to the first fail-safe valve, and a sixth port selectively supplying hydraulic pressure supplied to the fourth port to a friction element operating in third and fourth speeds; and a valve spool provided within the valve body and including a first land on which control pressure supplied through the first port acts, a second land on which, together with the first land, control pressure supplied through the second port acts, a third land selectively communicating the fourth port with the fifth port, a fourth land, together with the third land, selectively communicating the fourth port with the sixth port, and a fifth land on which hydraulic pressure supplied through the second port acts.

9. The hydraulic control system of claim 1, wherein the first fail-safe valve comprises a valve body including a first port receiving hydraulic pressure supplied to a second clutch as control pressure, a second port receiving hydraulic pressure supplied to a second brake as control pressure, a third port receiving line pressure as control pressure, a fourth port receiving R range pressure through a shuttle valve and hydraulic pressure from the switch valve, and a fifth port supplying hydraulic pressure supplied to the fourth port to a friction element operating as a fixed element in the neutral N, park P, and reverse R ranges;

a valve spool provided within the valve body and including a first land on which control pressure supplied through the first port acts, a second land on which control pressure supplied through the second port acts, a third land selectively communicating the fourth port and the fifth port, a fourth land, together with the third land, selectively communicating the fourth port with the fifth port, and a fifth land on which control pressure supplied to the third port acts.

10. The hydraulic control system of claim 1, wherein the second fail-safe valve comprises a valve body including a first port receiving R range pressure as control pressure, a second port receiving part of the hydraulic pressure supplied to a first clutch as control pressure, a third port receiving part of the hydraulic pressure supplied to a second clutch as control pressure, a fourth port receiving N-D range pressure as control pressure, a fifth port receiving hydraulic pressure from the second pressure control valve, and a sixth port supplying hydraulic pressure supplied to the fifth port to a friction element operating as a fixed element in the second and fourth speeds; and a valve spool provided within the valve body and including a first land on which control pressure supplied through the first port acts, a second land on which control pressure supplied through the second port acts, a third land on which control pressure supplied through the third port acts, a fourth land selectively communicating the fifth port and the sixth port, a fifth land communicating the fifth port and the sixth port together with the fourth land, and a sixth land on which control pressure supplied through the fourth port acts.

11. The hydraulic control system of claim 1, wherein the N-R control valve comprises a valve body including a first port receiving control pressure of the second solenoid valve, a second port connected to a R range pressure line, and a third port for supplying hydraulic pressure supplied to the second port to a friction element operating in the reverse R range; and a valve spool provided in the valve body and including a first land on which hydraulic pressure supplied through the first port acts, and a second land selectively opening and closing the second and third ports, an elastic member being interposed between the second land and the valve body.

12. The hydraulic control system of claim 11, wherein a line connected to the third port is branched to form another line that connects to a line connected to the second port with a check valve being provided on the branched line, the check valve ensuring that hydraulic pressure does not flow from upstream to downstream.

13. A hydraulic control system for an automatic transmission, comprising:

a shifting control assembly having a manual valve, which is indexed with a driver-manipulated select lever to effect line conversion;

a hydraulic pressure control assembly having a first pressure control valve and a first solenoid valve controlling N-D range pressure for supply to a friction element operating in third and fourth speeds, a second pressure control valve and a second solenoid valve controlling D range pressure for supply to a friction element operating in second and fourth speeds, and a third pressure control valve and a third solenoid valve controlling D range pressure for supply to a friction element operating in first, second, and third speeds;

a switching assembly having a switch valve effecting port conversion by line pressure supplied to both ends thereof and by hydraulic pressure supplied to a fourth solenoid valve, and selectively supplying hydraulic pressure supplied to the first pressure control valve to a friction element operating as a fixing element in neutral N, park P, and reverse R ranges, and to a friction element operating as an input element in third and fourth speeds;

a fail-safe assembly having a first fail-safe valve controlled by line pressure, operational pressure of a friction element operating as an input element in third and fourth speeds, and operational pressure of a friction element operating as a fixed element in second and fourth speeds, and selectively supplying hydraulic pressure supplied to the switch valve and reverse pressure supplied from the manual valve to a friction element operating as a fixed element in the neutral N, park P, and reverse R ranges, and includes a second fail-safe valve controlled by N-D range pressure, R range pressure, operational pressure of a friction element operating as an input element in first, second, and third speeds, and operational pressure of a friction element operating as an input element in third and fourth speeds, and selectively supplying control pressure of the second pressure control valve to a friction element operating as a fixed element in second and fourth speeds; and a N-R control assembly having an N-R control valve controlled by control pressure supplied from the second solenoid valve in the reverse R range, and supplying hydraulic pressure supplied from the manual valve to a friction element operating as an input element in the reverse R range.

14. The hydraulic control system of claim 13, wherein the manual valve includes a N-D range pressure line supplying control pressure to the first pressure control valve to control the same, and simultaneously supplying control pressure to the second fail-safe valve; a D range pressure line realizing connections for the supply of hydraulic pressure to the second and third pressure control valves; and a R range pressure line realizing connections for the supply of hydraulic pressure to the second fail-safe valve, the N-R control valve, and the regulator valve.

15. The hydraulic control system of claim 13, wherein the first, second, and third solenoid valves are duty control valves having a three-way valve that opens lines in an Off state.

16. The hydraulic control system of claim 13, wherein a line connecting the third pressure control valve and a friction element operating as an input element in the first, second, and third speeds, and a line connecting the switch valve and a friction element operating as an input element in the third and fourth speeds, are each connected to a D range pressure line, check valves being mounted to the lines to only allow for the reverse flow from downstream to upstream.

17. The hydraulic control system of claim 13, wherein the first pressure control valve comprises a valve body including a first port receiving hydraulic pressure reduced by the reducing valve, a second port receiving N-D pressure from the manual valve, a third port supplying hydraulic pressure supplied from the second port to the switch valve, and a fourth port receiving control pressure from the first solenoid valve; and a valve spool provided within the valve body and including a first land on which hydraulic pressure supplied through the first port acts, a second land on which hydraulic pressure supplied through the first port acts, together with the first land, to selectively open and close the second port, and a third land, together with the second land, selectively communicating the second port and the third port, an elastic member being interposed between the third land and the valve body.

18. The hydraulic control system of claim 13, wherein the second pressure control valve comprises a valve body including a first port receiving hydraulic pressure reduced by the reducing valve, a second port receiving D range pressure from the manual valve, a third port supplying hydraulic pressure supplied to the second port to the second fail-safe valve, and a fourth port receiving control pressure from the second solenoid valve; and a valve spool provided within the valve body and including a first land having a relatively small diameter, a second land on which hydraulic pressure supplied through the first port acts and that selectively opens and closes the second port, and a third land for selectively communicating the second port and the third port together with the second land, an elastic member being interposed between the third land and the valve body.

19. The hydraulic control system of claim 13, wherein the third pressure control valve comprises a valve body including a first port receiving reduced hydraulic pressure from the reducing valve, a second port receiving D range pressure from the manual valve, a third port supplying hydraulic pressure supplied to the second port to the second fail-safe valve, and a fourth port receiving control pressure from the third solenoid valve; and a valve spool including a first land on which hydraulic pressure supplied through the first port acts and that has a relatively small diameter, a second land on which hydraulic pressure supplied through the first port acts and that selectively opens and closes the second port, and a third land selectively communicating the second port and the third port together with the second land, an elastic member being interposed between the valve body and the third land.

20. The hydraulic control system of claim 13, wherein the switch valve comprises a valve body including first and second ports formed on opposite ends of the valve body and receiving line pressure, a third port adjacent to the first port and which receives control pressure of a fourth solenoid valve, a fourth port receiving hydraulic pressure from the first pressure control valve, a fifth port supplying hydraulic pressure supplied to the fourth port to the first fail-safe valve, and a sixth port selectively supplying hydraulic pressure supplied to the fourth port to a friction element operating in third and fourth speeds; and a valve spool provided within the valve body and including a first land on which control pressure supplied through the first port acts, a second land on which, together with the first land, control pressure supplied through the second port acts, a third land selectively communicating the fourth port with the fifth port, a fourth land, together with the third land, selectively communicating the fourth port with the sixth port, and a fifth land on which hydraulic pressure supplied through the second port acts.

* * * * *